Jan. 30, 1923.
C. S. RAYMOND.
COMBINED BUMPER AND FENDER FOR VEHICLES.
FILED DEC. 27, 1921.
1,443,850
2 SHEETS-SHEET 2
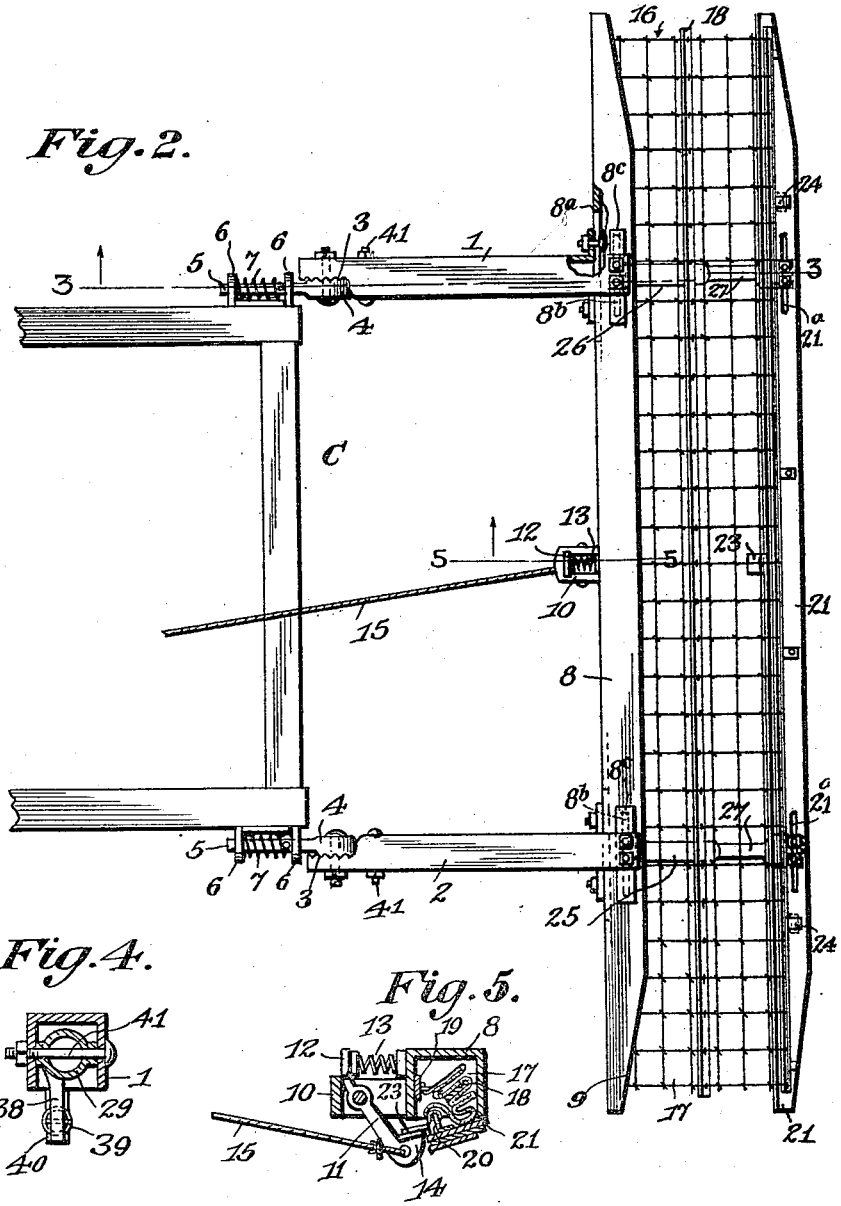
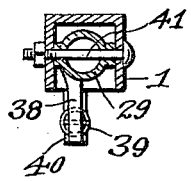
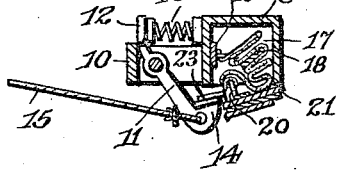
Charles S. Raymond, INVENTOR.
BY
Geo. P. Kimmel
ATTORNEY.

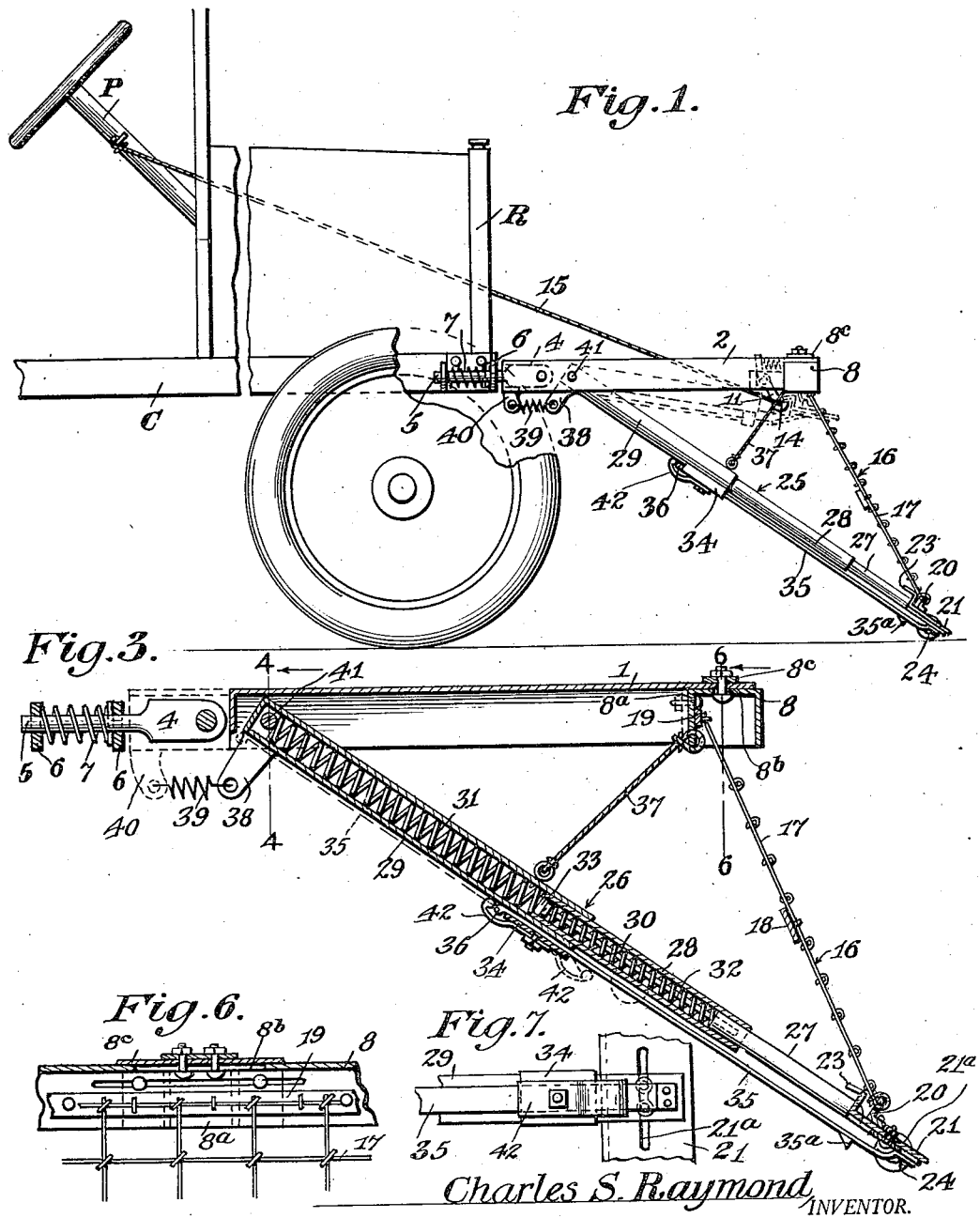

Patented Jan. 30, 1923.

1,443,850

UNITED STATES PATENT OFFICE.

CHARLES S. RAYMOND, OF MILWAUKEE, WISCONSIN.

COMBINED BUMPER AND FENDER FOR VEHICLES.

Application filed December 27, 1921. Serial No. 524,943.

*To all whom it may concern:*

Be it known that I, CHARLES S. RAYMOND, a citizen of the United States, residing at Milwaukee, in the county of Milwaukee and State of Wisconsin, have invented certain new and useful Improvements in Combined Bumpers and Fenders for Vehicles, of which the following is a specification.

This invention relates to fenders for automobiles and other wheeled vehicles.

The object of the invention is to provide a simple, strong and efficient fender for the protection of pedestrians, which when not in use as a fender may be collapsed into a small space and operates when so collapsed as a bumper to protect the vehicle.

Another object is to provide a combined fender and bumper, the fender being automatically projectible on the release of a catch.

Another object is to provide an apparatus of this character adjustable vertically to vary the angle of the bumper.

Another object is to provide an apparatus of this character which is normally held collapsed to perform the function of a bumper and which is composed of telescopic members equipped with guides for holding them against lateral movement, said guides having finger grips to facilitate the collapse of the fender when it is desired to be used as a bumper.

With these and other objects in view, the invention consists in certain novel features of construction as hereinafter shown, described and claimed.

In the accompanying drawings:

Figure 1 represents a side elevation of the front portion of a motor vehicle equipped with this improved attachment shown in open position for use as a fender, parts being broken out for convenience in illustration.

Fig. 2 is a top plan view thereof with parts broken out and in section.

Fig. 3 is a transverse section taken on the line 3—3 of Fig. 2.

Fig. 4 is a detail transverse section taken on the line 4—4 of Fig. 3.

Fig. 5 is a similar view taken on the line 5—5 of Fig. 2, with the parts shown in collapsed position for use as a bumper.

Fig. 6 is a similar view taken on the line 6—6 of Fig. 3, and

Fig. 7 is a detail plan view.

In the embodiment illustrated, the attachment constituting this invention is shown applied to the chassis C of an automobile. This attachment constituting the invention comprises two side bars 1 and 2 preferably composed of angle bars inverted U-shaped in cross section with their rear ends reduced in width as shown at 3 and serrated on their inner faces for adjustable engagement with similarly serrated faces of heads 4 carried by longitudinally slidable spring cushioned rods 5 mounted in laterally projecting apertured ears 6 carried by the side bars of the chassis.

On the rod 5 between the ears 6 are coiled springs 7 which cushion the rearward movement of the rod for a purpose presently to be described.

To the front ends of the bars 1 and 2 is secured a transversely arranged angle bar 8 also made U-shaped in cross section as is shown clearly in Fig. 5, with the open portion turned down and which is designed to perform the function of a housing for the fender when collapsed and as a portion of the bumper, the other member of which is carried by the extensible fender as will presently be more fully described.

The outer faces of the ends of the transverse bar 8 are preferably inclined inwardly as shown at 9 to approve the appearance of the bar and render it less clumsy looking when the device is used as a bumper.

A bracket 10 is secured to the rear face of the bar 8 midway the length thereof and has pivotally mounted therein a latch 11. Between the upper end 12 of the latch 11 and the rear face of bar 8 is arranged a coiled spring 13 which exerts its tension to normally hold the latch in operative position and to return it to such position after it has been released.

The engaging hook or bill 14 of the latch has connected therewith a releasing cable 15 which extends to any suitable point on the vehicle for actuation by the driver, it being here shown connected to the steering wheel post P, so that when a pull is exerted on this cable, the latch will be released from engagement with the fender which will be more fully hereinafter described.

The fender 16 which is carried by the cross bar 8 is composed of a netting 17 of any suitable material, said netting being flexible to permit the collapse of the fender when not in use and which is reinforced intermediate its width by a metal cross bar 18 which assists in holding the net in operative position and also to facilitate folding of the net when not in use. This net 17 has a metal bar 19 connected with its upper edge which bar is detachably engaged with the inner face of the rear side wall 8ᵃ of the bar 8 as is shown clearly in Fig. 3. The lower edge of said net carries a bar 20 which is detachably secured to a cross bar 21 which forms the lower member of the bumper when the fender is in closed or collapsed position. The cross bar 21 has an upstanding flange 22 along its rear edge to which is secured midway its length a lip 23 which is designed to be engaged by the beak or hook 14 of the catch 11 when the member 21 is in engagement with bar 8 to completely house the fender net 17 within bar 8 which forms the bottom of the bumper, operating also to protect the netting 17 when the attachment is in use as a bumper.

The bar 21 is provided at longitudinally spaced intervals with rollers or wheels 24 designed to travel on the roadway when the attachment is used as a fender to protect the fender against being caught by projections. Bars 8 and 21 are equipped with longitudinal slots 8ᵇ and 21ᵃ respectively for adjustable connection with the bars 1 and 2 to adapt the fender for use on cars of different widths. The slots 8ᵇ are covered by plates 8ᶜ carried by bars 1 and 2.

The bar 21 is connected at points spaced from the ends thereof with the side bars 1 and 2 by means of extensible and contractible supports 25 and 26 which are exactly alike and hence one only will be described in detail.

Each of these supports is composed of telescopically connected members 27, 28 and 29, the sections 28 and 29 being hollow and each equipped with a coiled spring shown respectively at 30 and 31, which springs exert their tension to project bar 21 when the latch 11 is disengaged from the lip 23 thereof. The spring 30 which is carried by the intermediate section 28 is shown coiled around a rod 32 the lower end of which is engaged with the outermost section 27 and its upper end is headed and bears against a plate 33 which also forms an abutment for the lower end of the spring 31 within the section 29.

Extending laterally from the lower end of the section 29 on its outer face is an eye or loop 34 which forms a guide for a bar 35 secured at its lower end to the cross bar 21 and which assists in holding bar 21 against movement laterally relative to the vehicle. These bars 35 are provided at their upper ends with outturned ends 36 to prevent separation of telescoping members when projected by the springs 31 and 32. Reversible spring catches 42 are carried by guides 34 and are adapted when the fender is projected to engage the ends 36 of bars 35 and hold the fender members 25 and 26 rigid against accidental collapse. The bars 35 are provided near their outer or front ends with lugs 35ᵃ to be engaged by the catches 42 when the fender is collapsed to enable the operator to properly fold the net 17 and place it in its housing 8. These catches 42 may be turned end for end as shown in full and dotted lines in Fig. 3 so that they may hold the fender either extended or retracted. After the net 17 has been housed the catches are disengaged from lugs 35ᵃ and turned up ready for engagement with the bar ends 36 on the projection of the fender.

Cables 37 are shown connecting the lower ends of the sections 29 with the outer ends of bars 1 and 2 to assist in supporting the fender when in operative position.

The upper ends of the sections 29 are equipped with laterally extending arms 38 which projects downwardly and are apertured at their free ends for the engagement of a coiled spring 39 which connects said arms with depending apertured lugs 40 carried by the bars 1 and 2 as is shown clearly in Figs. 1 and 3, said springs tending to hold the front ends of the fender engaged with the surface over which the vehicle is travelling.

The upper ends of the sections 29 are pivotally connected with the inner ends of the bars 1 and 2 as shown at 41 so that the supports 25 and 26 when the sections thereof are in retracted position will fit within said bars and be completely housed thereby.

In the use of this apparatus, it having been connected with the chassis C in the manner above described and as shown in Fig. 2, the parts being opened up for use as a fender in said figure, when it is desired that the fender shall be collapsed and the attachment used as a bumper, the outturned ends 36 on the bars 35 on the opposite sides of the apparatus are released from catches 42 and said catches swing with their bills facing forward. The members 27 and 28 are moved rearwardly to their extreme limit by springs 30 and 31, which causes the netting 17 to fold and the cross bar 21 to move up under the open portion of the cross bar 8. The catches 42 are then engaged with lugs 35ᵇ until the netting is folded and housed within said bar, the bar 21 closing the lower open side of bar 8. When in this position, the cross bar 21 is held engaged by hooking the bill 14 of the latch member 11 over the lip 23 of said cross bar, when the device will be ready for use as a bumper as shown in Fig. 5. The catches 42 are released from lugs 35ª after the net has been properly folded and are turned up ready for the next projection of the fender.

The apparatus is retained during the normal operation or travel of the vehicle, collapsed within the hollow bar or casing 8, the casing and the supporting bars 1 and 2 being all that are visible.

When the fender is to be employed in an emergency or other application, the driver grabs the cable 15 and exerts a pull thereon thereby releasing the latch 11 from the lip 23 of the cross bar or plate 21 which closes the casing or bar 8. Immediately this latch is released, the combined force of gravity and the positive thrust of the expanding springs 30 and 31 cause the sections 27 of the supports 25 and 26 to push outwardly thereby projecting the fender while the springs 39 operate to lower it and to hold it in lowered position. The wheels 24 support the lower edge of the fender and prevent any destructive effect thereon from any forward movement of the vehicle until the brakes have brought the vehicle to a full stop. The replacement of the fender in its folded position to adapt it to operate as a bumper has been described above and when so folded the springs 7 resiliently support the casing and act to absorb shocks encountered through head-on collisions and to partially prevent the jar of objects falling into the net from being communicated unduly to the vehicle.

The preferred embodiment of the invention is disclosed in the drawings and set forth in the specification, but it will be understood that modifications within the scope of the claimed invention may be made in the construction without departing from the principle of the invention or sacrificing any of its advantages.

I claim:—

1. A fender for wheeled vehicles comprising a casing to receive a net in folded condition, a plate arranged in parallel with said casing, said net having opposite edges connected to said casing and plate, means for releasably securing said plate to said casing, a pair of cylinders having axially arranged bores therein and pivotally connected at one end to the vehicle, elements reciprocatively received in said cylinders and connected with said plate, springs in said cylinders to project said elements, and springs connecting the inner ends of said cylinders to a fixed support and so arranged as to exert a downward pull on the cylinders to lower the fender when the plate is released.

2. A fender for wheeled vehicles comprising a casing to receive a net in folded condition, a plate arranged in parallel with said casing, said net having opposite edges connected to said casing and plate, means for releasably securing said plate to said casing, a pair of cylinders having axially arranged bores therein and pivotally connected at one end to the vehicle, elements reciprocatively received in said cylinders and connected with said plate, springs in said cylinders to project said elements, said cylinders having laterally extending arms at their inner ends on their lower faces, and coiled springs connecting the free ends of said arms to a fixed support whereby a downward pull is exerted on said cylinders to lower the fender when the plate is released.

3. In an apparatus of the class described, a supporting frame, a pair of spring cushioned longitudinally slidable rods mounted on said frame, a hollow transverse bar having rearwardly extending rigid arms, said rods and arms having lapping serrated faces with bolts extending therethrough for adjustable connection of said members, said hollow bar being open on its lower face, a collapsible fender connected with said bar to fold therein, a closure for said frame carried by the free end of the fender, and releasing means for said closure.

4. In an apparatus of the class described, a supporting frame, a transverse bar mounted on said frame and of inverted U-shape in cross section, a plate for closing said bar, a collapsible fender connected at one end within said bar and at its other to said plate, cooperating means carried by said plate and bar for releasably holding said plate closed and the fender collapsed, spring projectible telescoping sections connected with said frame and plate to project the plate when released, and cooperating guides carried on by said plate and the other by one of said sections to guide the fender in its opening and closing movements.

5. In an apparatus of the class described, a supporting frame, a transverse bar mounted on said frame and of inverted U-shape in cross section, a plate for closing said bar, a collapsible fender connected at one end within said bar and at its other to said plate, cooperating means carried by said plate and bar for releasably holding said plate closed and the fender collapsed, spring projectible telescoping sections connected with said frame and plate to project the plate when released, loops on the frame carried sections, and bars carried by said plate and slidable in said loops to guide the fender in its opening and closing movements.

6. In an apparatus of the class described, a supporting frame, a transverse bar mounted on said frame and of inverted U-shape in cross section, a plate for closing said bar, a collapsible fender connected at one end within said bar and at its other to said plate, cooperating means carried by said plate and bar for releasably holding said plate closed and the fender collapsed, spring projectible telescoping sections connected with said frame and plate to project the plate when released, loops on the frame carried sections, and bars carried by said plate and slidable in said loops to guide the fender in its opening and closing movements, the free ends of said bars being bent to form stops for the telescoping sections against the tension of said springs.

In testimony whereof, I affix my signature hereto.

CHARLES S. RAYMOND.